(12) United States Patent
Hosono et al.

(10) Patent No.: US 8,000,190 B2
(45) Date of Patent: Aug. 16, 2011

(54) OPTICAL DISK DEVICE AND OPTICAL DISK PROCESSING SYSTEM

(75) Inventors: Yasushi Hosono, Fujimino (JP);
Tsuyoshi Oyamatsu, Machida (JP);
Yutaka Kobayashi, Musashino (JP)

(73) Assignee: TEAC Corporation, Tama-shi, Tokyo (JP)

( * ) Notice: Subject to any disclaimer, the term of this patent is extended or adjusted under 35 U.S.C. 154(b) by 55 days.

(21) Appl. No.: 12/537,203

(22) Filed: Aug. 6, 2009

(65) Prior Publication Data

US 2010/0034064 A1 Feb. 11, 2010

(30) Foreign Application Priority Data

Aug. 8, 2008 (JP) ................................ 2008-204966

(51) Int. Cl.
*G09B 20/00* (2006.01)
(52) U.S. Cl. .................................. 369/47.15; 369/53.11
(58) Field of Classification Search ............... 369/47.15, 369/47.49, 47.53, 47.55
See application file for complete search history.

(56) References Cited

U.S. PATENT DOCUMENTS

| | | | | |
|---|---|---|---|---|
| 6,785,213 | B2 * | 8/2004 | Shishido et al. | 369/59.25 |
| 7,593,299 | B2 * | 9/2009 | Akahoshi et al. | 369/47.54 |
| 2005/0185537 | A1 * | 8/2005 | Ninomiya | 369/44.33 |
| 2006/0245322 | A1 | 11/2006 | Akahoshi | |
| 2008/0063384 | A1 | 3/2008 | Tanaka et al. | |

FOREIGN PATENT DOCUMENTS

| | | |
|---|---|---|
| CN | 1855240 A | 11/2006 |
| CN | 101140764 A | 3/2008 |
| JP | 2006-65947 A | 3/2006 |
| JP | 2006-309866 A | 11/2006 |

OTHER PUBLICATIONS

Office Action for corresponding CN Application No. 200910166012, dated Mar. 3, 2011, 7 pages.

* cited by examiner

*Primary Examiner* — Aristotelis Psitos
(74) *Attorney, Agent, or Firm* — Seed IP Law Group PLLC

(57) ABSTRACT

An optical disk device which flexibly and efficiently executes verification of recorded data is provided. A drive controller sets an area to be verified and a mode of verification according to a command which is supplied from a host device. For the area to be verified, the user selects one or a plurality of lead-in, inner, middle, and outer areas. For the verification mode, the user selects one of an immediate execution mode and an in-close-command execution mode. In a duplicator or the like in which same data is recorded on a plurality of optical disks, the user can designate an important data portion and selectively execute verification.

5 Claims, 8 Drawing Sheets

OPTICAL DISK DEVICE AND OPTICAL DISK PROCESSING SYSTEM

PRIORITY INFORMATION

This application claims priority to Japanese Patent Application No. 2008-204966, filed on Aug. 8, 2008, which is incorporated herein by reference in its entirety.

BACKGROUND

1. Technical Field

The present invention relates to an optical disk device and an optical disk processing system, and in particular to a verification process.

2. Related Art

Conventionally, a verification process is known for securing reliability of recorded data. The verification process is a process in which, after user data is recorded, the data is replayed and it is checked whether or not the data can be normally replayed without an error, with a strict error evaluation standard. In the case of a recordable optical disk, the optical disk has a lead-in area, a user data area, and a lead-out area. For the data recorded in the lead-in area, after the data is recorded, the tray is ejected, and then, the optical disk is again loaded and it is checked whether or not normal startup is possible. For the data recorded in the user data area, the above-described verification process is executed to secure the reliability. However, for the lead-in area, there is a problem in that time is required due to the wasteful operation of ejection/loading of the tray and that, in the case of fraudulent recording in the lead-in area, the startup process requires a significant amount of time. In addition, for the user data area, because the verification process includes replay of the recorded data, when the verification process is executed, recording and replaying of the data are repeatedly executed, and, thus, the recording speed is practically reduced.

JP 2006-65947 A discloses a technique wherein only a predetermined area immediately before an area where recording is normally completed or only a predetermined area immediately before an area where an error has occurred is verified, in order to shorten the process time. JP 2006-309866 A discloses a technique where presence/non-presence of the verification operation is determined based on a verification operation presence/non-presence matrix table which corresponds in one-to-one relationship to each media ID which is provided in the optical disk drive in advance.

However, the above-described related art are directed to automatic determination of presence/non-presence of verification process or automatic setting of an area to be verified by the drive, and there is a problem in that the techniques are not flexible and the efficiency is low for a particular type of optical disk. For example, when custom-made optical disks such as school learning materials, commemorative items, presents, etc. are manufactured, the same recording data is automatically recorded on a plurality of optical disks, and, in particular, a data portion for which the quality of the recorded data is to be secured is roughly determined. In this case, for example, it is not meaningful if only an outer periphery portion for which an error tends to occur is verified, and a verification process of only the data portion for which the quality of recorded data is to be secured is desired. The data portion for which the quality of the data is to be secured differs depending on the content of the data to be recorded, and, thus, it is desirable to allow suitably setting of the data portion according to the data.

SUMMARY

The present invention advantageously provides a device and a system in which a data area for which the verification process should be applied can be suitably and efficiently set.

According to one aspect of the present invention, there is provided an optical disk comprising a recording unit which records user data, a verification unit which executes, after data is recorded on an optical disk, a verification process in which the recorded data is replayed and it is checked whether or not the recorded data can be normally replayed, and a controller which controls the verification unit to execute the verification process on at least one area, among the recorded areas of the optical disk, which is set by a user.

According to another aspect of the present invention, it is preferable that, in the optical disk device, the controller controls, according to an execution mode which is set by the user, the verification unit to immediately execute the verification process on the area or execute the verification process on the area in a close command.

According to another aspect of the present invention, it is preferable that, in the optical disk device, the area which is set by the user is at least one of a relatively inner area, a relatively middle area, and a relatively outer area, among the recording areas.

According to another aspect of the present invention, there is provided an optical disk processing system comprising the above-described optical disk device, a printing unit which prints on a label surface of the optical disk, a display unit which displays a setting screen for allowing the user to set at least one area for which the verification process is to be executed, and a system controller which supplies data of the area which is set by the user to the optical disk device, wherein the system consecutively processes data recording at the optical disk device and label surface printing at the printing unit.

According to another aspect of the present invention, there is provided an optical disk processing system comprising a plurality of the above-described optical disk devices, a display unit which displays a setting screen for allowing the user to set at least one area for which the verification process is to be executed, and a system controller which supplies data of the area which is set by the user to the optical disk device, wherein the system consecutively processes data recordings at the plurality of optical disk devices.

According to various aspects of the present invention, the user can suitably and efficiently set a data area for which the verification process is to be executed.

The present invention will be more clearly understood with reference to the below-described preferred embodiment. However, the preferred embodiment is described merely for exemplifying purposes, and the scope of the present invention is not limited to the preferred embodiment.

DETAILED DESCRIPTION

A preferred embodiment of the present invention will now be described with reference to the drawings.

Figure 1:
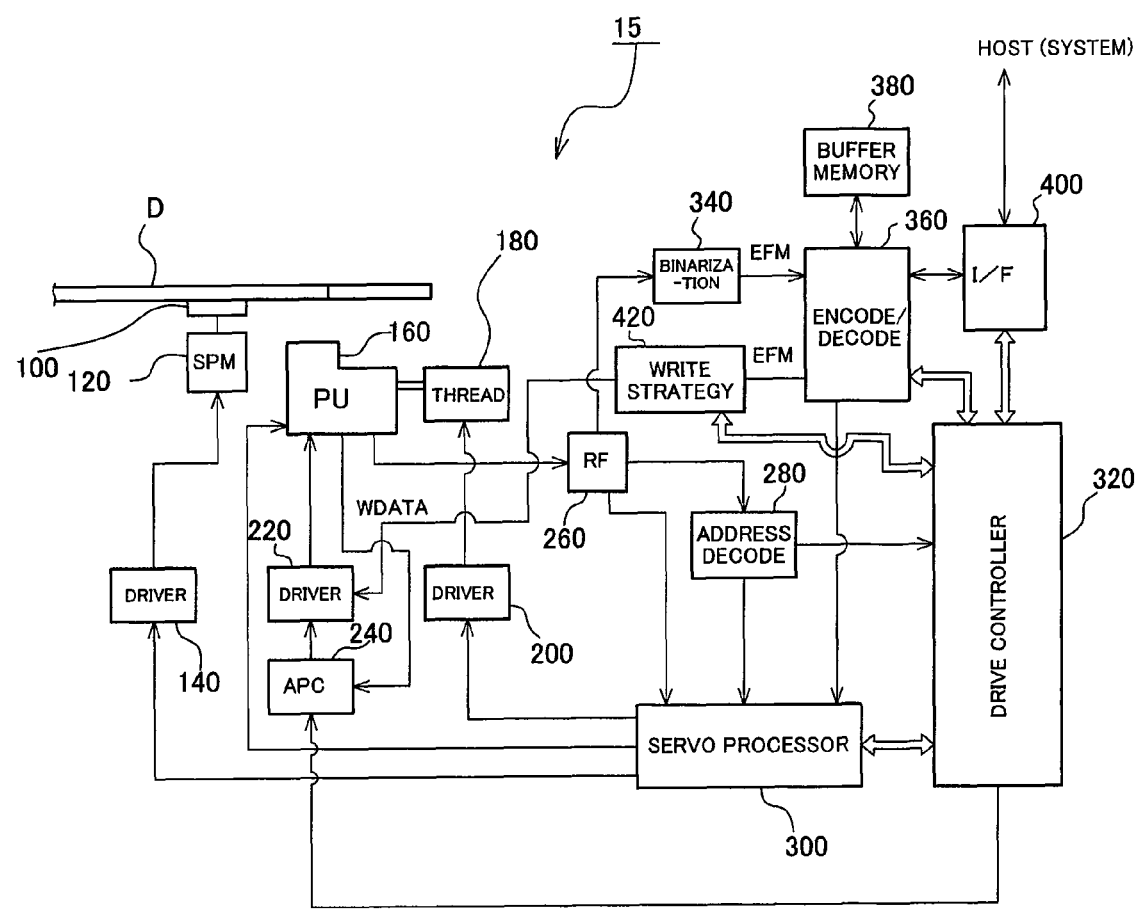
FIG. 1 is a structural block diagram of an optical disk device.

FIG. 1 is a block diagram which shows an internal structure of the optical disk device 15. An optical disk D which is loaded by a disk tray is clamped by a magnetic damper (not shown), is placed on a turntable 100, and is rotationally driven by a spindle motor (SPM) 120 along with the turntable 100. The spindle motor SPM 120 is driven by a driver 140, which is servo-controlled by a servo processor 300 so that the spindle motor SPM 120 has a desired rotation speed.

An optical pickup 160 comprises a laser diode (LD) for irradiating laser light on the optical disk D and a photodetector (PD) which receives reflected light from the optical disk D and converts into an electric signal, and is placed opposing the optical disk D. The optical pickup 160 is driven in a radial direction of the optical disk D by a thread motor 180 which is driven by a driver 200. The driver 200 is servo-controlled by the servo processor 300 similar to the driver 140. In addition, the LD of the optical pickup 160 is driven by a driver 220, and, in the driver 220, a drive current is controlled by an automatic power control circuit (APC) 240 so that the laser power is at a desired value. The APC 240 and the driver 220 control the amount of light emission of the LD by an instruction from a drive controller 320. In FIG. 1, the driver 220 is provided separately from the optical pickup 160, but the driver 220 may alternatively be equipped in the optical pickup 160.

When data is recorded on the optical disk D, data to be recorded which is supplied from the system which is the host is supplied through an interface I/F 400 to an encode/decode circuit 360. The encode/decode circuit 360 stores the data to be recorded in a buffer memory 380, encodes the data to be recorded into modulated data, and supplies the modulated data to a write strategy circuit 420. The write strategy circuit 420 converts the modulated data into multi-pulse (a pulse train) according to a predetermined recording strategy, and supplies as recording data to the driver 220. Because the recording strategy affects the recording quality, normally, the recording strategy is fixed to a certain optimum strategy. The laser light having the power modulated by the recording data is irradiated from the LD of the optical pickup 160 and data is recorded on the optical disk D. After the data is recorded, the optical pickup 160 irradiates laser light of replay power to replay the recording data and supplies to an RF circuit 260. The RF circuit 260 supplies the replay signal to a binarization circuit 340, and binarized data is supplied to the encode/decode circuit 360. When the verification process is to be executed, the encode/decode circuit 360 decodes the modulated data, and checks whether or not an error is detected under a condition with a stricter evaluation standard than normal. The result of verification is supplied to the drive controller 320. Based on the result of the verification, the drive controller 320 determines whether the data continues to be recorded, an alternate recording is to be executed on an alternate recording area which is secured in advance, or recording is to be interrupted due to the error.

In such a structure, unlike the related art, the optical disk device of the present embodiment does not always verify or automatically set the area to be verified on the side of the drive, but rather, the user manually sets the area to be verified. More specifically, a setting program of a host device such as a personal computer and an upper device is activated, to display a setting screen on the screen, to allow the user to freely set the verification area using the setting screen. When the user sets using the setting screen, the set command is supplied from the host device to the drive controller 320 as an ATAPI command. The drive controller 320 receives the command from the host device, and executes the verification process according to the received command.

Figure 2:
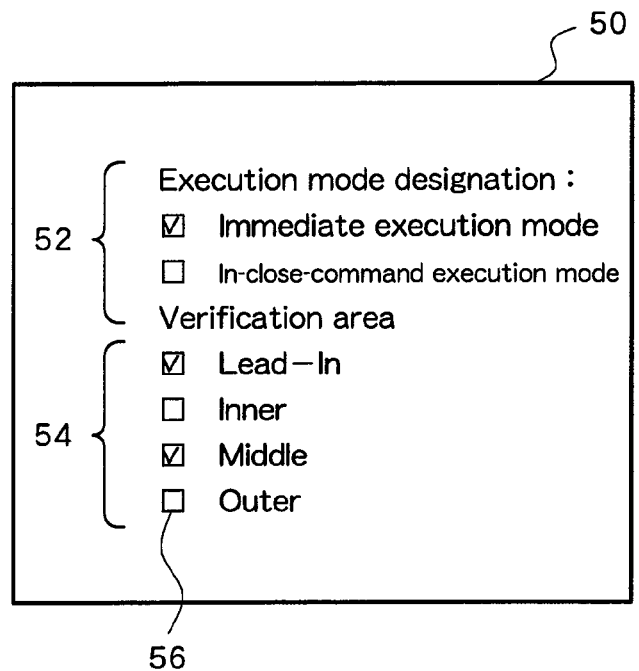
FIG. 2 is an explanatory diagram of a setting screen.

FIG. 2 shows an example of a setting screen 50 displayed on a screen of the host device. The setting screen 50 includes a mode designating section 52 for designating an execution mode and an area specifying section for specifying the verification area. The mode designating section 52 shows an immediate execution mode and an in-close-command (CLOSE) execution mode, and allows selection of one of these modes. A check box 56 is displayed in front of each mode, and the user selects one of the modes by placing a check mark in the check box. The area specifying section 54 shows, as the area to be verified, a lead-in area (Lead-In), an inner area (Inner), a middle area (Middle), and an outer area (Outer), and the area specifying section 54 allows arbitrary selection of one or a plurality of these areas. A check box 56 is displayed in front of each area, and the user selects an area by placing a check mark in the check box. The inner, middle, and outer areas are not fixed areas with respect to the optical disk D, and are relative areas determined among the recorded areas of the recording data. In other words, when the recording data is recorded to the middle of the optical disk D, the inner, middle, and outer areas are relatively set within the range of the recorded area. Therefore, the outer area of the recorded area may correspond to a physical middle area on the optical disk D. FIG. 2 shows a case when the immediate execution mode is selected with the mode designating section 52 and the lead-in and middle areas are selected with the area specifying section 54.

As described above, the area specifying section 54 is for specifying the area to be verified. The specifying method of the area is not limited to the specifying by inner, middle, and outer areas, and other specifying methods of the area may alternatively be employed. For example, it is possible to further divide the inner area into two areas or to divide the middle area into two areas. It is also possible to distinguish as a start area, a mid area, and an end area. Alternatively, the areas may be specified by directly designating the addresses. When the address is directly designated, the start address and the length may be designated.

Figure 3:
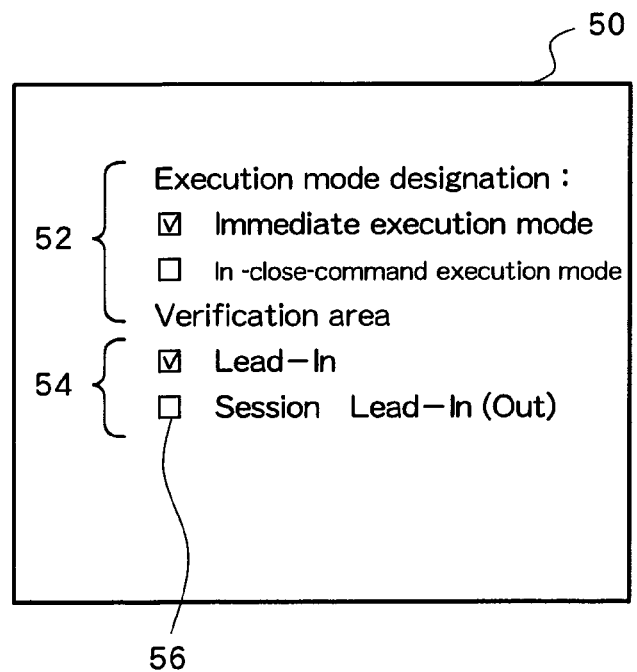
FIG. 3 is an explanatory diagram of another setting screen.

FIG. 3 shows an example of another setting screen 50. The setting screen of FIG. 3 is a setting screen 50 for the case where the optical disk D is a multi-session disk. The setting screen 50 includes a mode designating section 52 and an area specifying section 54. The mode designating section 52 shows an immediate execution mode and an in-close-command execution mode, and the area designating section 54 shows a lead-in and session lead-in (out). The session lead-in (out) includes an area in which management information of each session is recorded, and the management information is referred to as an RMD (Recording Management Data) in DVD-R or the like. In DVD+R or the like, the management information is referred to as an SDCB (Session Disc Control Blocks). One or a plurality of the lead-in and the session lead-in (out) may be arbitrarily selected. In DVD+R or the like, the disk is a multi-session and in DVD-R or the like, the disk is a multi-border. In this case, the border-in (out) corresponds to the session lead-in (out).

When a mode and an area of verification are set using the setting screen 50 of FIG. 2 or FIG. 3, the setting command is supplied to the drive controller 320, and the drive controller 320 executes the verification process according to the setting command. In the present embodiment, the setting commands are hereinafter called an easy verify setting command (Easy Verify).

Figure 4:
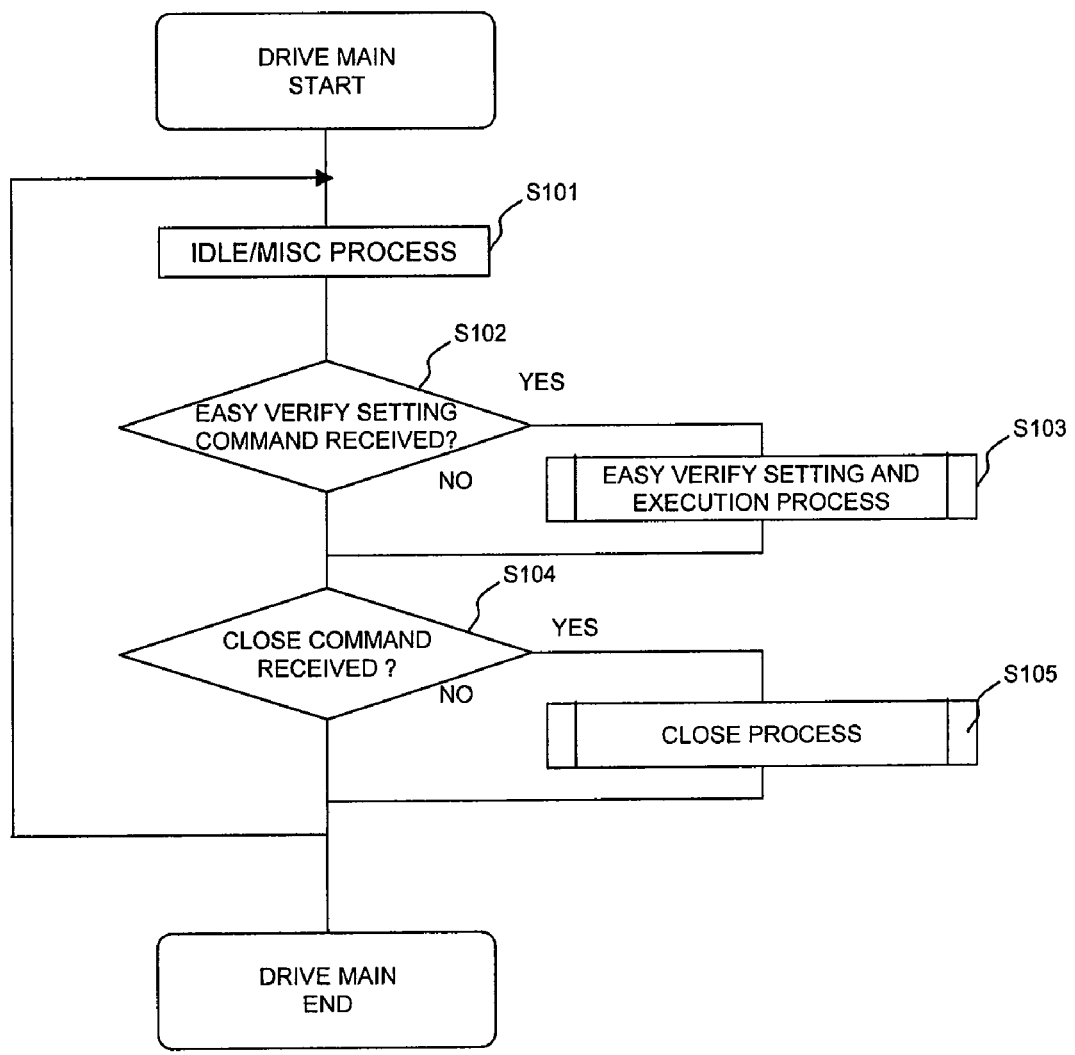
FIG. 4 is a flowchart of a main process.
Figure 5:
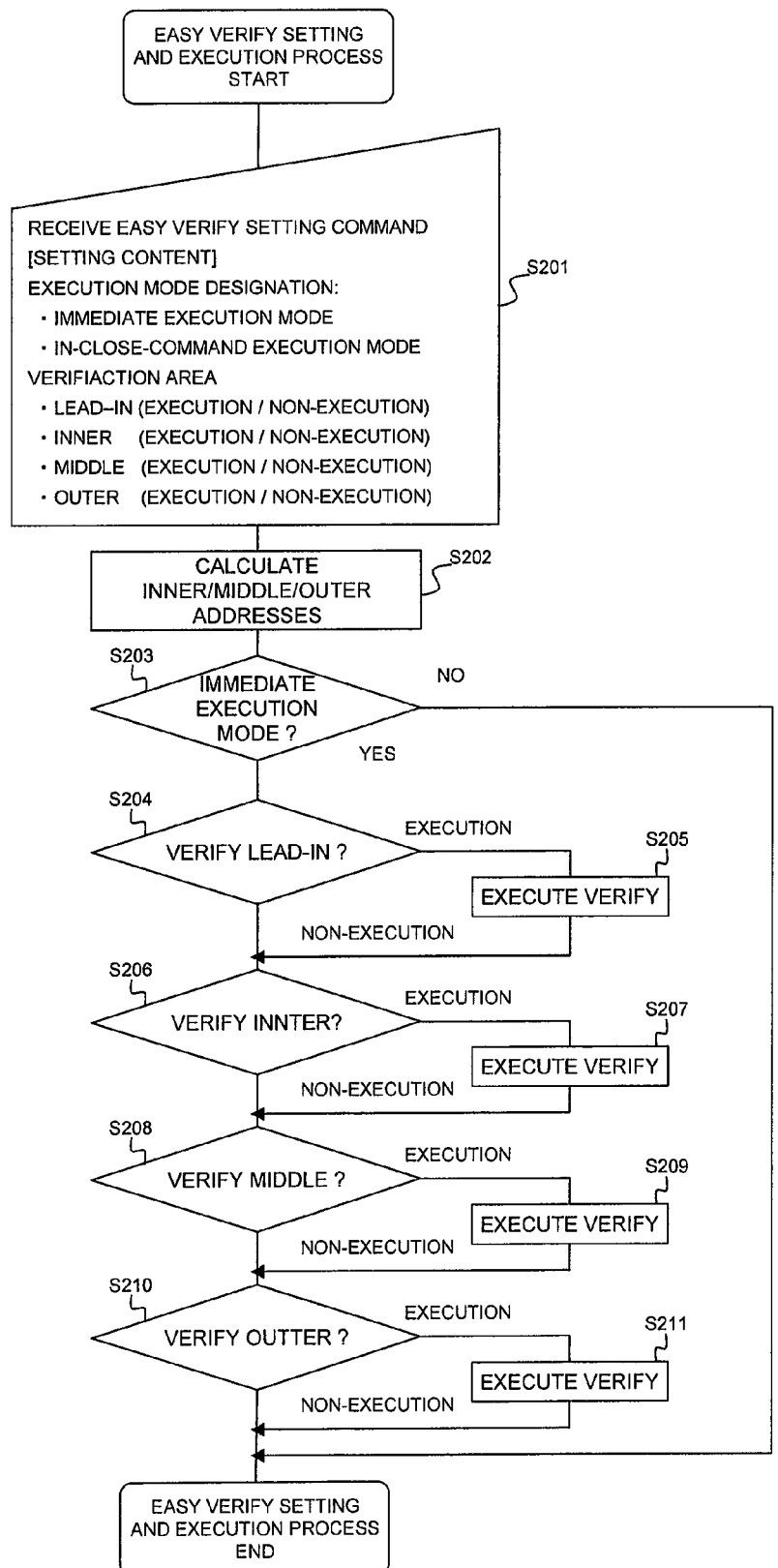
FIG. 5 is a flowchart of execution of easy verification process.
Figure 6:
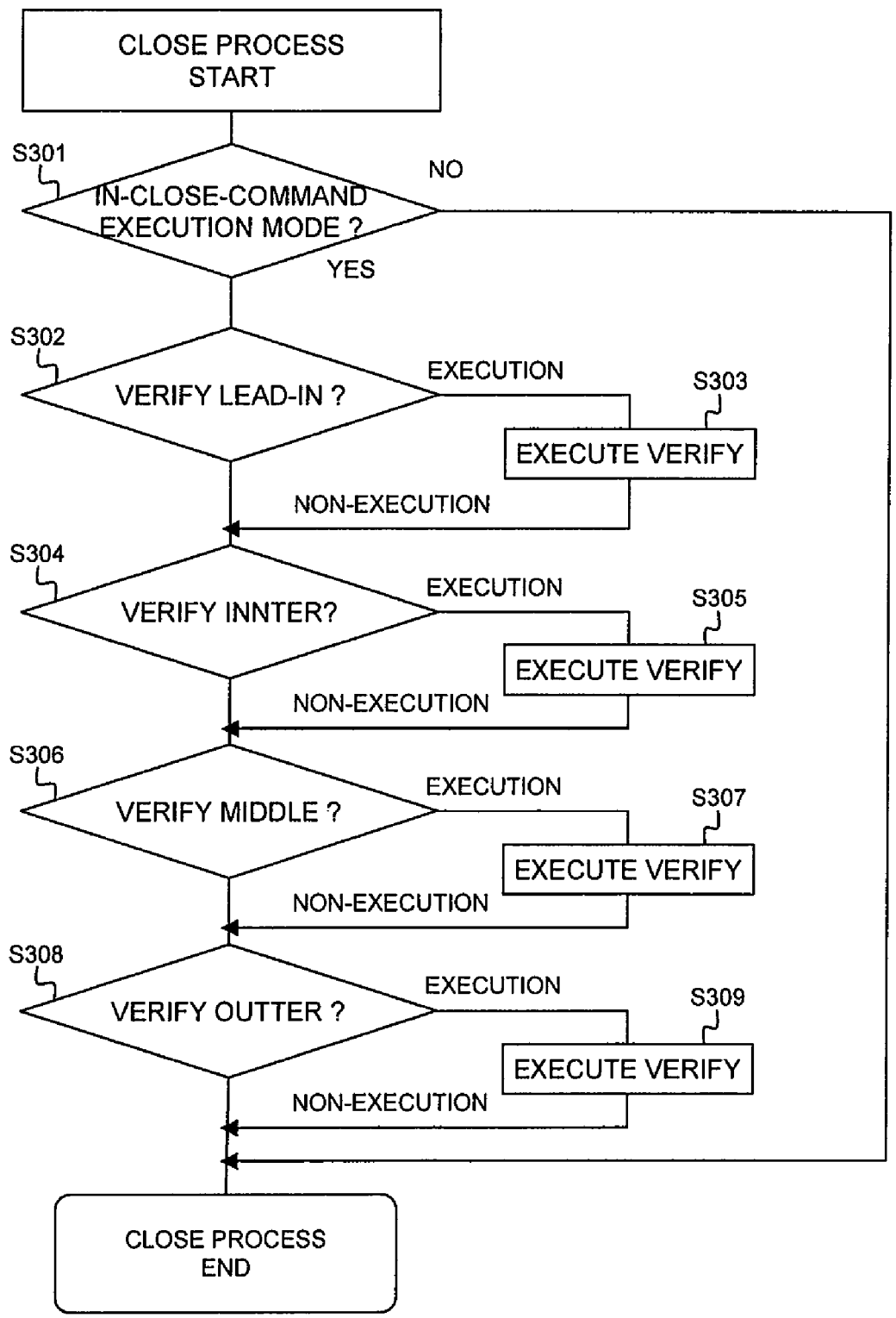
FIG. 6 is a flowchart of a close process.

FIGS. 4-6 show process flowcharts of the present embodiment. FIG. 4 shows the main process. First, initial setting processes such as an idle process are executed (S101), and it is judged whether or not the easy verify setting command is received (S102). When the easy verify setting command is received, a process is executed according to the setting command (S103). Then, it is judged whether or not a close command is received (S104), and, when the close command is received, a process according to the command is executed (S105).

FIG. 5 is a detailed flowchart of a process according to the easy verify setting command in S103 of FIG. 4. First, the setting command is received, and the execution mode and the verification area are set (S201). When the verification area is divided into the lead-in (Lead-In), inner (Inner), middle (Middle), and outer (Outer) areas, and execution or non-execution (no execution) of verification is set in each area. For example, in the example configuration of FIG. 2, the verification execution is set in the lead-in and middle areas and the verification non-execution is set in the other areas.

Next, addresses of the inner, middle, and outer areas are calculated (S202). As is already described, the inner, middle, and outer areas are relatively determined according to the recorded area. Therefore, the first ⅓ of the recorded data capacity is set as the inner area, an area to the ⅔ is set as the middle area, and the area to the ⅔ is set as the outer area, and the first few tracks in each area are set as the verification target. With regard to the address of the lead-in, because the area is determined for each type of the optical disk D, the drive controller 320 automatically sets the address according to the type of the optical disk D.

Then, it is judged whether or not the mode is the immediate execution mode (S203), and, when the mode is the immediate execution mode, the verification process is immediately executed on the data which is already recorded at the timing when the setting command is received (S204~S210). More specifically, when the verification of the lead-in is set, the verification of the lead-in is executed (S204, S205). When the verification of the inner area is set, the verification of the data of the address on the inner area calculated at S202 is executed (S206, S207). Similarly, the verifications of the middle area and of the outer area are executed (S208~S211). In the example configuration of FIG. 2, only the verifications of the lead-in and middle areas are executed in S205 and S209.

The readability (replaying capability) at the verification is desirably set in consideration of the compatibility with other drives. The readability of the verification is adjusted by monitoring PI (inner code parity), PO (outer code parity), and C1C2 error during replay in verification, and judging as an error when the monitored parameter exceeds a predetermined threshold value (error evaluation standard).

FIG. 6 is a detailed flowchart of the close process at S105 of FIG. 4. First, it is judged whether or not the execution mode is the in-close-command execution mode (S301). When the execution mode is the immediate execution mode, the verification is not executed in the close process. When, on the other hand, the execution mode is the in-close-command execution mode, verification of a particular area is executed in the close process which is always executed when an optical disk D is created (S302~S309). More specifically, a normal close process is executed, and then, the verification of the area which is set is executed.

Figure 7:
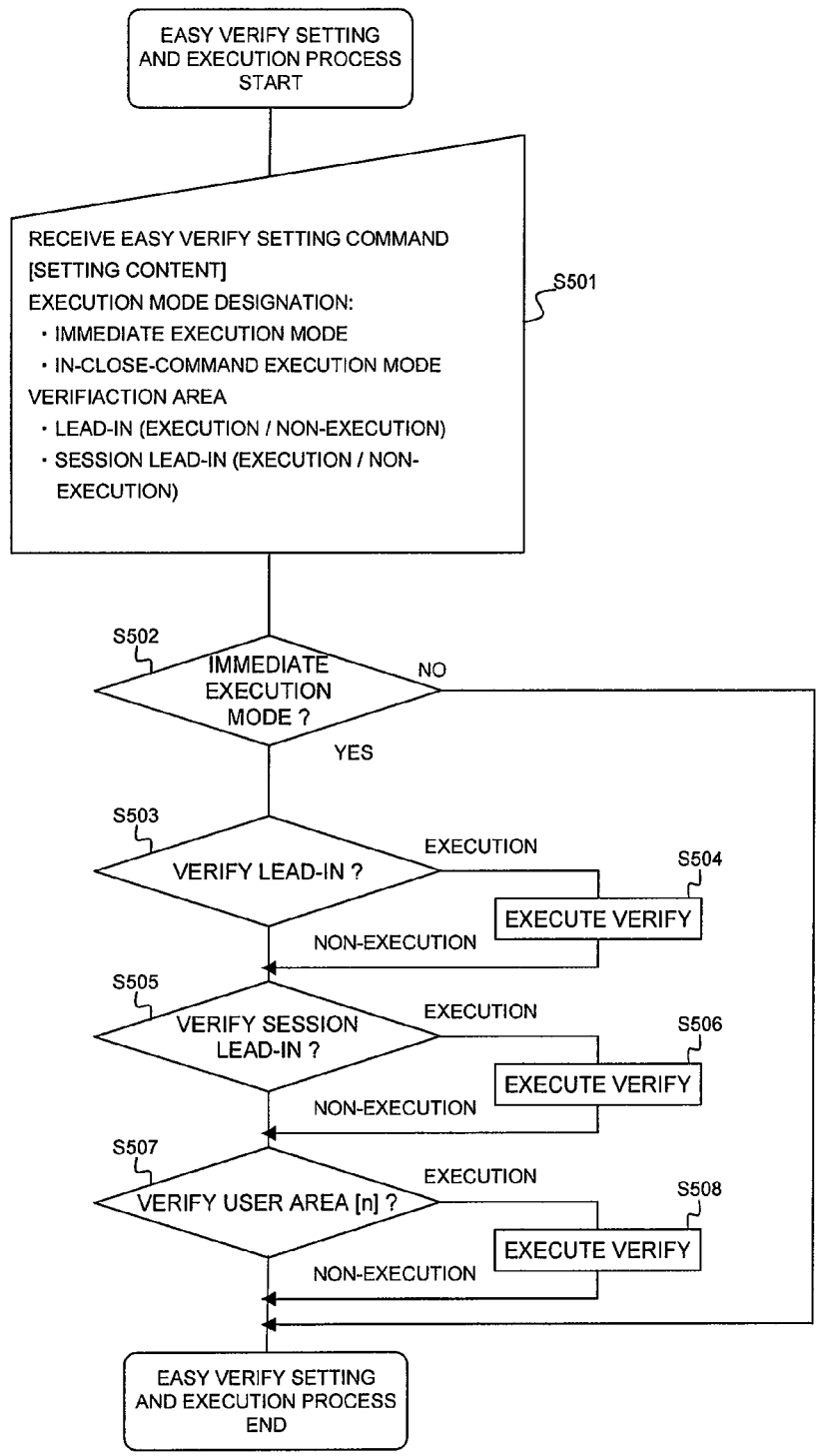
FIG. 7 is a flowchart of execution of another easy verification process.
Figure 8:
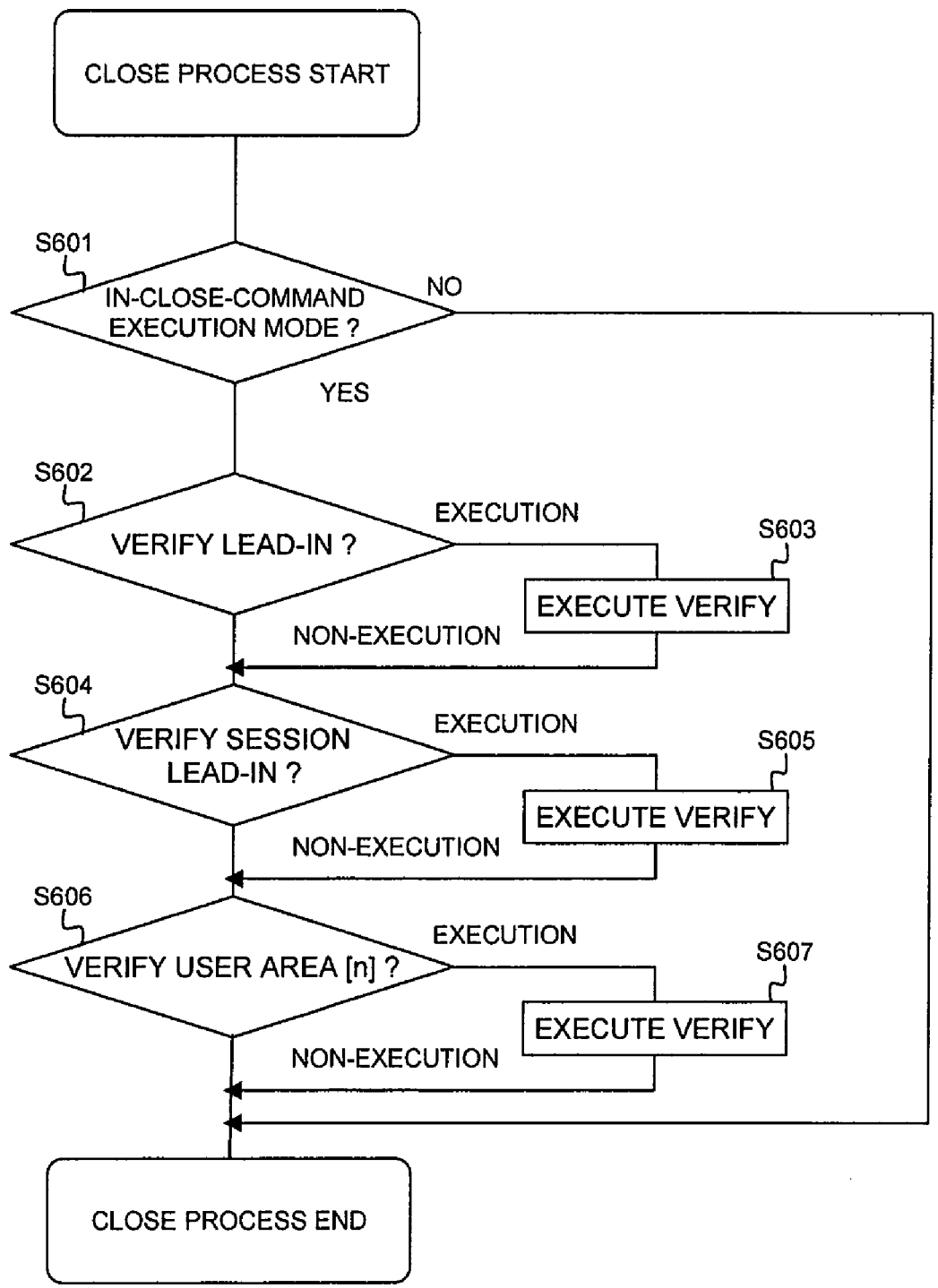
FIG. 8 is a flowchart of another close process.

FIGS. 7 and 8 show a process flowchart for a case of a multi-session disk. FIG. 7 is a detailed flowchart in S103 of FIG. 4. In S502, it is judged whether or not the mode is the immediate execution mode. In S503~S508, verification of a particular area is executed. In S507, the user area is divided into a plurality, and one or a plurality of these areas are verified. This is the case when the setting screen 50 of FIG. 3 is employed and one or a plurality of the plurality of user data can be selected. FIG. 8 is a detailed flowchart of the close process in S105 of FIG. 4. It is judged whether or not the mode is the in-close-command execution mode in S601, and verification of a particular area is executed in the close process in S602~S607. In other words, the normal close process is first executed and, then, verification of the area which is set is executed. The normal close process is a process to complete each session (border), and is more specifically a process to record the border-in, border-out, etc.

As described, in the present embodiment, because the user can specify an area to be verified, it is possible to flexibly and efficiently execute verification. For example, when certain data must be recorded on a plurality of optical disks D such as in the case of a duplicator, for example, an area in which particularly important data is recorded is specified. Thus, the user can set the verification areas such as the lead-in and the middle areas, to efficiently secure the reliability of the data in the plurality of optical disks D. In addition, in the present embodiment, the user can set the execution mode of the verification in addition to the area to be verified. Therefore, the operability of the user is very high. When the mode is set to the immediate execution mode, verification can be immediately executed on data which is already recorded, to secure reliability of the data. When the mode is set to the in-close-command execution mode, verification can be automatically executed in only the area selected by the user by merely issuing a normal close command and not newly issuing a special command, and, thus, the device is convenient for usage. The configuration that does not require separate issuance of a command for verification would also reduce the load of the application program design. Moreover, even when the lead-in is verified, because the configuration differs from the related art in which the tray is ejected and then loaded again, the verification time can be shortened.

Figure 9:
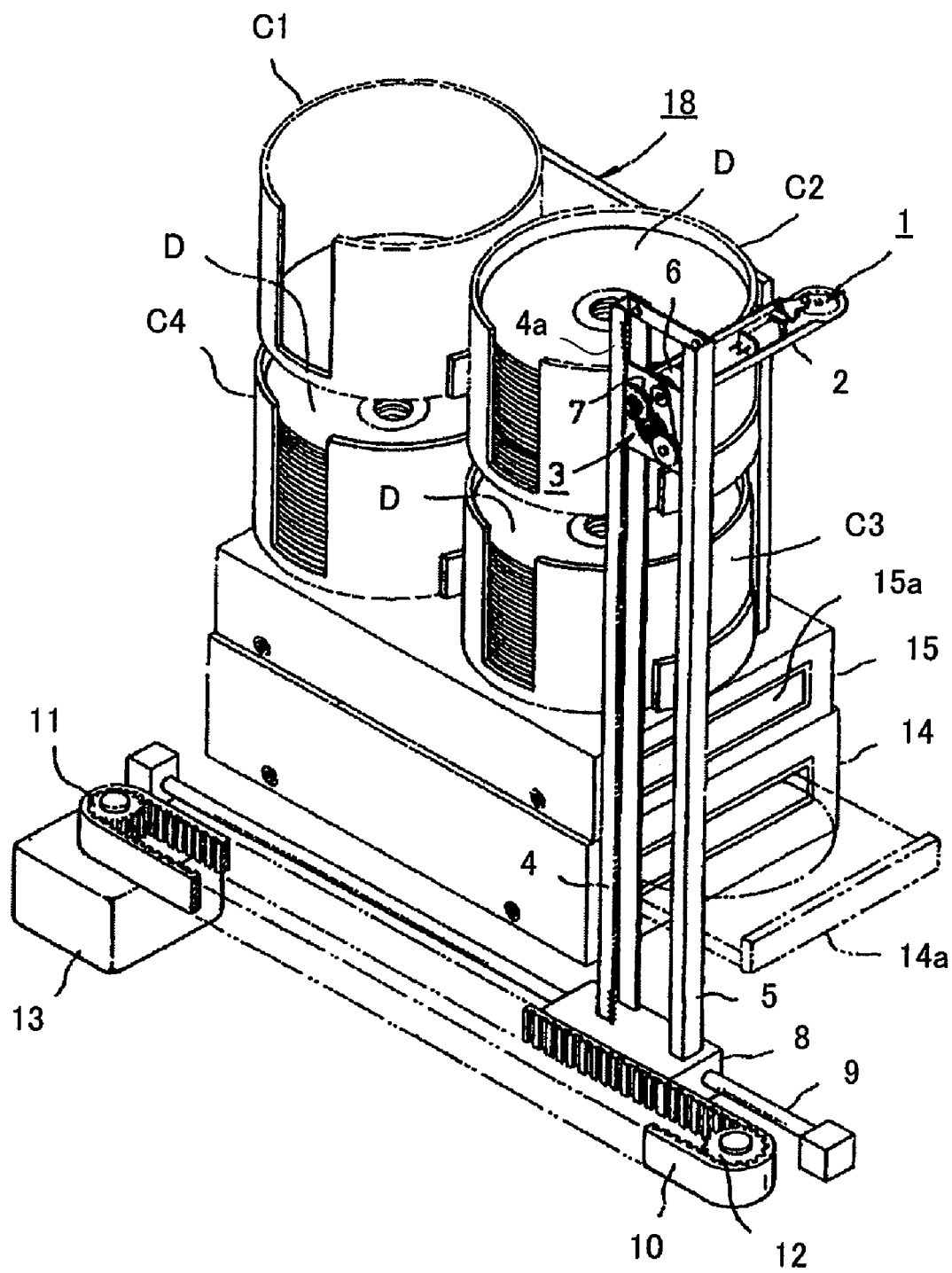
FIG. 9 is an overview of an optical disk processing system.

FIG. 9 shows an overview of an optical disk processing system having an optical disk device according to a preferred embodiment of the present invention. On an upper surface of a ceiling plate of a recording unit 15 which is an optical disk device 15, a plurality of cases C1, C2, C3, and C4 for storing optical disks D and having a same volume are placed. These cases C1, C2, C3, and C4 are supported by a support structure 18 placed at the back of the cases, and are configured to be detachable from the support structure 18. In the placement state of the cases C1, C2, C3, and C4 shown in FIG. 9, the case C1 is set as a collection case and cases C2, C3, and C4 are set as stock cases, and a predetermined number of optical disks which are not yet processed are stored in the cases.

A clamp unit 1 is for clamping a center hole of the optical disk D, and is provided on a transport arm 2. One end of the transport arm 2 is fixed on an elevation mechanism 3. The elevation mechanism 3 is supported by support columns 4 and 5, a driving force of an output shaft of a motor 6 is transmitted to a gear 7 through a pulley, the elevation mechanism 3 is moved up and down along a vertical direction by engagement of the gear 7 with a rack gear 4a of the support column 4, and the transport arm 2 is moved up and down.

An end of the support columns 4 and 5 is fixed on a slider block 8 which is supported in a slidable manner on a guide shaft 9. The slider block 8 is also connected and fixed on a belt 10 which is provided in a stretched manner between wheels 11 and 12. With the belt 10 driven by a motor 13, the slider block 8, the support columns 4 and 5, and the transport arm 2 move back and forth in a horizontal direction.

A printing unit 14 prints on a label surface of the optical disk D loaded by a disk tray 14a. The recording unit 15 records information on an optical disk D which is loaded by a disk tray 15a.

In the transporting of the optical disk D among the cases, printing unit 14, and recording unit 15, the transporting of the optical disk D in the upward and downward directions is achieved by the elevation mechanism 3 and the transporting in the horizontal direction is achieved by driving the belt 10.

In the process of the optical disk D, a control program is configured so that the optical disks are processed for each of the cases C2, C3, and C4 which are stock cases, and a system processor which controls an operation of the overall system executes the control program. First, an optical disk D at an uppermost layer of the case C2 is clamped by the disk clamp unit 1, and is sequentially transported to the printing unit 14 and the recording unit 15 and subjected to predetermined processes. After the predetermined processes are completed, the processed optical disk D is stored in the case C1 which is the collection case. After the optical disks D of the case C2 are sequentially processed and the case C2 is emptied of the optical disk D, the control program at this point judges to set the case C2 as the collection case. As the process is continued, after the predetermined processes are applied to the optical disks D which are stored in the case C3 and which are not yet processed, the optical disks D are stored in the case C2 which is now set as a collection case. Then, similar processes are repeated.

In the above description, for the optical disk D, first the printing unit 14 prints on the label surface, and, then the recording unit 15 records the data. However, the present invention is not limited to such a configuration, and it is also possible to employ a configuration, for example, in which the optical disk D taken out from the case is first transported to the recording unit 15, data is recorded by the recording unit 15, and then the printing unit 14 prints on the label surface.

The system processor of the optical disk processing system executes a setting program stored in a ROM, to display the setting screen 50 of FIG. 2 or FIG. 3 on a display screen (not shown). The optical disk processing system comprises an operation panel and an LCD. The system processor displays the setting screen 50 of FIG. 2 or FIG. 3 on the LCD, and the user places a check on the check box 56 using the operation panel. The setting screen 50 may alternatively be displayed on a display of a computer which controls the operation of the optical disk processing system. In this case, the user places a check mark in the check box 56 using a mouse or a keyboard. The mode and area which are set by the user using the setting screen 50 are supplied from the system processor through the I/F 400 to the drive controller 320 as ATAPI commands, and the verification operation is controlled. In a duplicator, a second recording unit is provided in place of the printing unit 14. In other words, a plurality of recording units are provided.

The optical disks D are sequentially supplied to the plurality of recording units, and are ejected after data is recorded. The number of recording units as the optical disk device needs not be 2, and, alternatively, three or more recording units may be provided.

What is claimed is:

1. An optical disk device comprising:
a recording unit configured to record user data;
a verification unit configured to execute, after data is recorded on an optical disk, a verification process in which the recorded data is replayed and it is checked whether or not the recorded data can be normally replayed;
an interface unit configured to receive a user's setting of at least one area, among a plurality of recording areas of the optical disk, as the area for which the verification process is to be performed; and
a controller configured to control the verification unit to execute the verification process on the at least one area set by the user.

2. The optical disk device according to claim 1, wherein the controller is further configured to control, according to an execution mode which is set by the user, the verification unit to immediately execute the verification process on the area or to execute the verification process on the area in a close process.

3. The optical disk device according to claim 1, wherein the area which is set by the user is at least one of a lead-in area, a relatively inner area, a relatively middle area, and a relatively outer area, among the recording areas.

4. An optical disk processing system comprising:
the optical disk device according to claim 1;
a printing unit configured to print on a label surface of the optical disk;
a display unit configured to display a setting screen for allowing the user to set the at least one area for which the verification process is to be executed; and
a system controller configured to supply data regarding the area which is set by the user to the interface unit of the optical disk device, wherein
the system is configured to consecutively process data recording at the optical disk device and label surface printing at the printing unit.

5. An optical disk processing system comprising:
a plurality of the optical disk devices according to claim 1;
a display unit configured to display a setting screen for allowing the user to set the at least one area for which the verification process is to be executed; and
a system controller configured to supply data regarding the area which is set by the user to the interface unit of the optical disk device, wherein
the system is configured to consecutively processes process data recordings at the plurality of optical disk devices.

* * * * *

UNITED STATES PATENT AND TRADEMARK OFFICE
CERTIFICATE OF CORRECTION

| | |
|---|---|
| PATENT NO. | : 8,000,190 B2 |
| APPLICATION NO. | : 12/537203 |
| DATED | : August 16, 2011 |
| INVENTOR(S) | : Yasushi Hosono et al. |

Page 1 of 1

It is certified that error appears in the above-identified patent and that said Letters Patent is hereby corrected as shown below:

Column 8, Lines 52-53:
"the system is configured to consecutively processes process data recordings" should read,
--the system is configured to consecutively process data recordings--.

Signed and Sealed this
Fourth Day of October, 2011

David J. Kappos
*Director of the United States Patent and Trademark Office*